(12) United States Patent
Dailey et al.

(10) Patent No.: US 8,998,130 B2
(45) Date of Patent: Apr. 7, 2015

(54) SELF-ALIGNING INLET PLENUM SYSTEM FOR ROTORCRAFT

(75) Inventors: Zachary E. Dailey, Keller, TX (US); Thomas M. Mast, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 292 days.

(21) Appl. No.: 13/703,785

(22) PCT Filed: Apr. 28, 2011

(86) PCT No.: PCT/US2011/034237
§ 371 (c)(1),
(2), (4) Date: Dec. 12, 2012

(87) PCT Pub. No.: WO2012/148394
PCT Pub. Date: Nov. 1, 2012

(65) Prior Publication Data
US 2013/0087663 A1  Apr. 11, 2013

(51) Int. Cl.
*B64D 33/02* (2006.01)
(52) U.S. Cl.
CPC ........ *B64D 33/02* (2013.01); *B64D 2033/0293* (2013.01); *B64D 2033/0253* (2013.01)
(58) Field of Classification Search
CPC .............. B64D 33/02; B64D 2033/02; B64D 2033/0266; B64D 2033/0253; F02C 7/04
USPC ................................. 244/53 B; 137/15.1, 15.2
See application file for complete search history.

(56) References Cited

U.S. PATENT DOCUMENTS

| | | | | |
|---|---|---|---|---|
| 3,421,296 A | * | 1/1969 | Beurer, Sr. | 55/306 |
| 3,449,891 A | * | 6/1969 | Amelio et al. | 55/306 |
| 4,369,937 A | * | 1/1983 | LeBell et al. | 244/53 R |
| 4,456,458 A | * | 6/1984 | Gilbertson | 55/306 |
| 4,689,060 A | | 8/1987 | Koske | |
| 6,109,562 A | * | 8/2000 | Crone | 244/119 |
| 6,247,668 B1 | | 6/2001 | Reysa et al. | |
| 7,192,462 B2 | * | 3/2007 | Stelzer et al. | 55/306 |
| 7,634,984 B2 | * | 12/2009 | Stelzer et al. | 123/198 E |
| 2005/0229558 A1 | * | 10/2005 | Stelzer et al. | 55/385.3 |
| 2007/0151214 A1 | * | 7/2007 | Stelzer et al. | 55/306 |
| 2010/0230530 A1 | | 9/2010 | Nannoni | |

OTHER PUBLICATIONS

International Search Report and Written Opinion from the International Searching Authority in related PCT Application No. PCT/US2011/034237, mailed Dec. 13, 2011, 10 pages.
European Search Report in related European patent application No. 11864163, 8 pages, mailed Mar. 18, 2014.

* cited by examiner

*Primary Examiner* — Philip J Bonzell
(74) *Attorney, Agent, or Firm* — James E. Walton; Damon R. Hickman

(57) ABSTRACT

An inlet system for a rotorcraft includes a cowl door assembly and a plenum assembly. The cowl door assembly includes a door member, a cowl inlet opening, and a cowl inlet duct. The plenum assembly is configured to free float in relation to the cowl door. The plenum assembly includes a plenum duct with a plenum band configured to attach the plenum assembly to an inlet opening. An aft seal is located between the aft plenum flange and a firewall, the aft seal being configured to provide a compressive contact between the plenum assembly and the firewall.

15 Claims, 8 Drawing Sheets

SELF-ALIGNING INLET PLENUM SYSTEM FOR ROTORCRAFT

TECHNICAL FIELD

The system of the present application relates to a self-aligning inlet plenum system for a rotorcraft.

DESCRIPTION OF THE PRIOR ART

Conventional rotorcraft typically have cowlings configured to act as a protective fairing around the engine and other propulsion related components. Other rotorcraft configurations may include an engine housed in a nacelle which acts as an aerodynamic pod for the engine. The nacelle configuration is typically employed when the engine is located a distance from the fuselage, such as on a wing of the rotorcraft. An inlet systems may be used to provide an aerodynamic flow path from the exterior of the cowling (or nacelle), to the engine inlet. Conventional inlet systems are typically hard mounted between structures, such as firewalls, fairings, and engine inlet, for example. As such, the tolerance accumulation in adjoining structures typically result in gaps and steps in the flow path, which cause aerodynamic flow losses. Further, the tolerance variation between adjoining structures can lead to misalignment of the inlet system. Furthermore, conventional hard mounted inlet systems block access to propulsion components for maintenance personnel.

Considerably shortcomings in conventional inlet systems remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
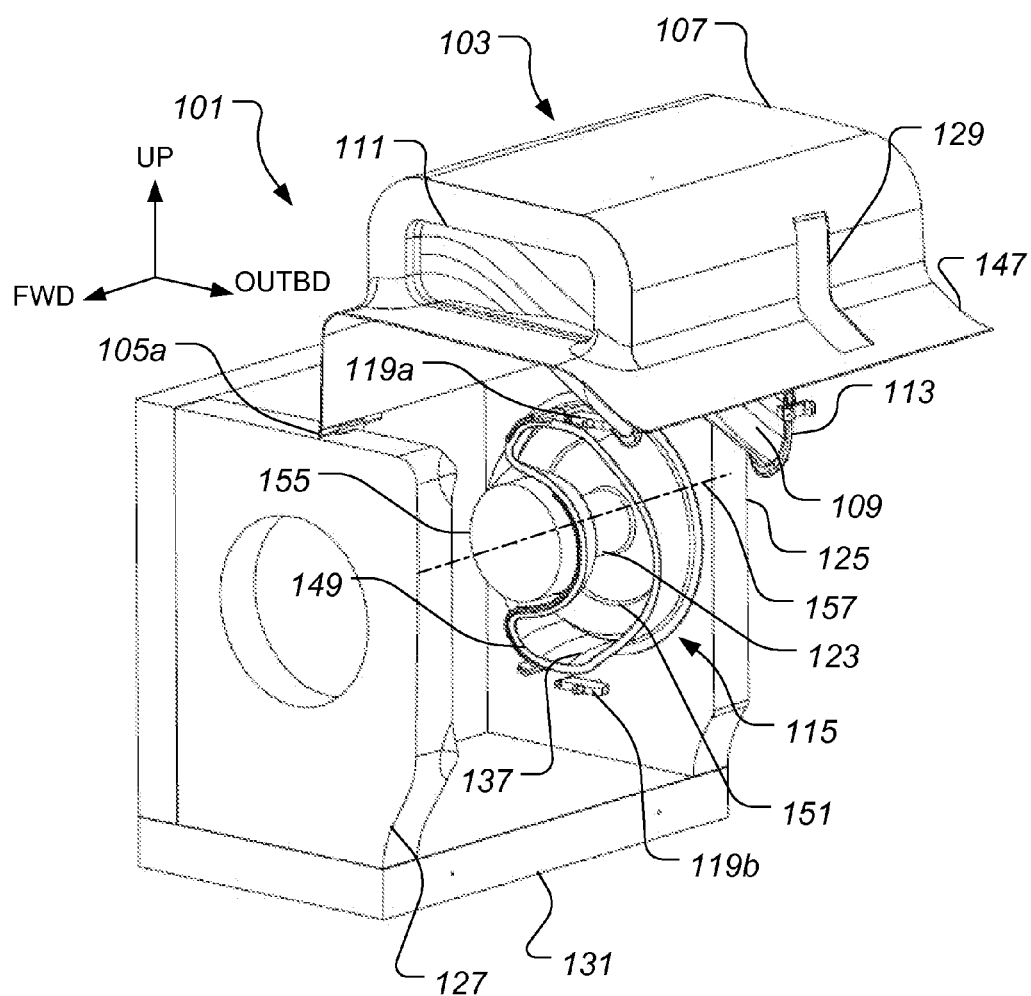
FIG. 1 is a partial perspective view of an inlet system, according the preferred embodiment of the present application.
Figure 2:
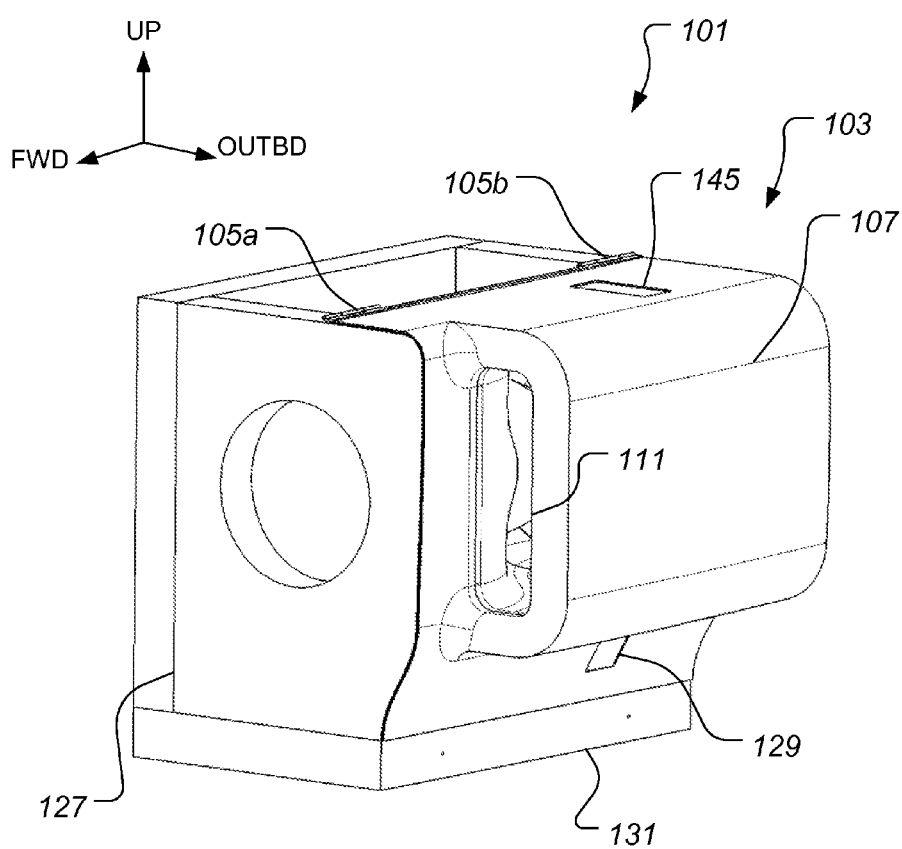
FIG. 2 is a partial perspective view of the inlet system, according the preferred embodiment of the present application.
Figure 3:
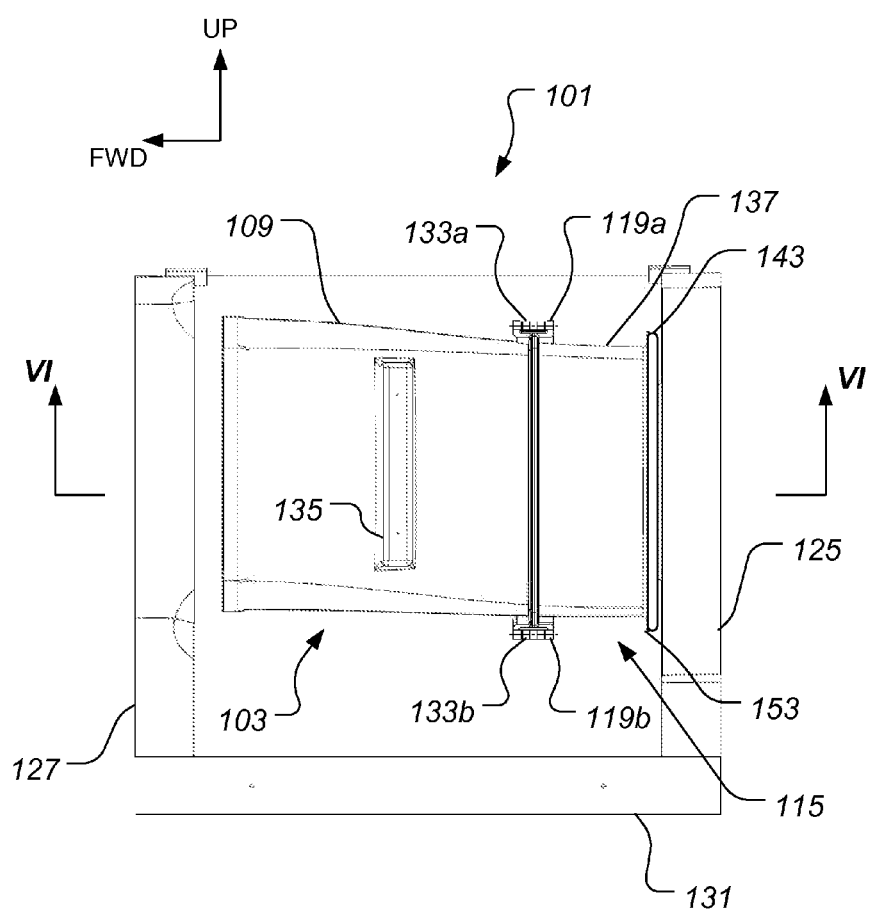
FIG. 3 is a partial side view of the inlet system, according the preferred embodiment of the present application.
Figure 4:
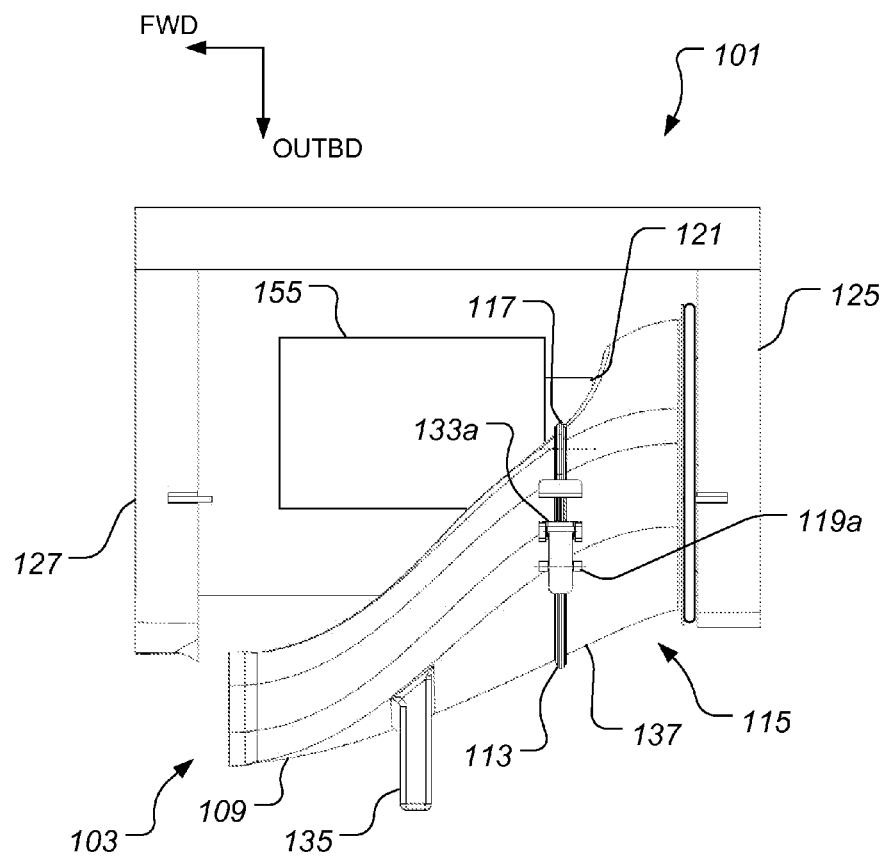
FIG. 4 is a partial top view of the inlet system, according the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The inlet system of the present application ensures alignment between mating parts by provides a free floating plenum assembly which mates with a cowl door assembly, thereby preventing misalignment of the complex contoured plenum and inlet. As such, the inlet system prevents undesired gaps and steps in the flow path in the cowl inlet duct and plenum, thereby providing a cleaner air flow path to the engine. Further, the free floating plenum assembly allows the inlet system parts associated therewith to be interchangeable and replaceable. Even further, the inlet duct is hard mounted to the cowl door, so that when the cowl door assembly is opened, the inlet duct is at least partially removed out of the area so as to provide better maintenance access.

Referring to FIGS. 1-5, an inlet system 101 according to the preferred embodiment of the present application is illustrated. Inlet system 101 includes a cowl door assembly 103 and a plenum assembly 115. The cowl door assembly 103 includes a door member 147 with an inlet opening 111. The inlet opening 111 acts an aerodynamic scoop, which during forward flight provides ram air to the engine. It should be appreciated that inlet opening 111 may take on a wide variety of shapes and sizes in accordance with the specific aircraft implementation and requirements thereof. Door member 147 is attached to an aircraft structure 127 and a firewall 125 via hinges 105a and 105b, respectively. An upper fuselage structure 131 represents an upper portion of the aircraft fuselage. An outer fairing 107 provides an aerodynamic surface for door member 147. Cowl door assembly 103 further includes a cowl inlet duct 109 which provides an aerodynamic flow path between inlet opening 111 and a plenum opening 149. A duct support 135 provides structural support between duct 109 and outer fairing 107.

Plenum assembly 115 includes a plenum duct 137 which provides an aerodynamic flow path between plenum opening 149 and an engine bell mouth 151. Plenum duct 137 partially wraps around a portion of a gearbox 155. A torque tube 123 extends between gearbox 155 and engine 161, the torque tube 123 being configured to rotatably transfer torque between engine 161 and gearbox 155. In FIG. 1, gearbox 155 is only partially illustrated for clarity. As further described herein, a faying surface 121 of gearbox 155 at least partially secures free floating plenum assembly 115. It should be appreciated that alternative embodiments may not rely on faying surface 121 of gearbox 155 for partially securing free floating plenum assembly 115; instead, a different mechanical component or structure may be used to limit one or more degrees of freedom of free floating plenum assembly 115.

Figure 5:
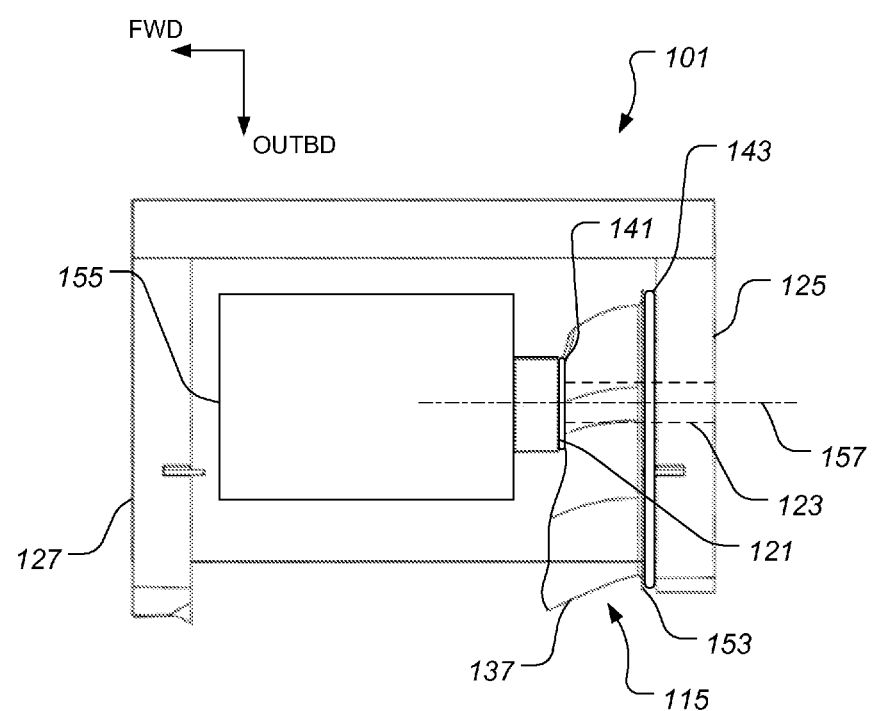
FIG. 5 is a partial schematic top view of the inlet system, according to the preferred embodiment of the present application.

Referring to FIG. 5, plenum duct 137 is shown partially removed for clarity. Gearbox 155 is schematically illustrated. Gearbox 155 is operably associated with torque tube 123. Gearbox 155 is coupled to the aircraft structure while torque tube 123 is coupled to the engine. A forward seal 141 is located between a forward surface of plenum duct 137 and faying surface 121 on the aft side of gearbox 155. Further, an aft seal 143 is located between an aft plenum flange 153 and a forward surface of firewall 125. Seals 141 and 143 are preferably bulb type seals; however, seals 141 and 143 make take on a wide variety of configurations. Seals 141 and 143 may be any component capable of providing flexible bearing contact between adjacent components. In the preferred embodiment, forward seal 141 is affixed to plenum duct 137. For example, an adhesive or fasteners may be used to affix forward seal 141 to plenum duct 137. Aft seal 143 is preferably affixed to plenum flange 153 with adhesive or fasteners, for example.

Still referring to FIG. 5, installation of free floating plenum assembly 115 includes locating plenum assembly 115 so that torque tube 123 extends through plenum duct 137. Gearbox 155 is then installed, thereby at least partially entrapping plenum assembly 115 between faying surface 121 and firewall 125. With plenum assembly 115 in the installed position, aft seal 143 is in compression between aft plenum flange 153 and firewall 125. Similarly, forward seal 141 is in compression between faying surface 121 of gearbox 155 and a forward surface of plenum duct 137. As such, free floating plenum assembly 115 is entrapped by firewall 125 and faying surface 121 of gearbox 155, but free floating plenum assembly 115 is configured to free float. For example, free floating plenum assembly 115 is allowed to float in a forward direction resulting in an increase in compression of forward seal 141 and a decrease in compression of aft seal 143. Conversely, free floating plenum assembly 115 is allowed to float in an aft direction resulting in a decrease in compression of forward seal 141 and an increase in compression of aft seal 143. Further, free floating plenum assembly 115 is configured to float in rotation about a torque tube axis 157. The rotational float may be achieved through a deflection in seals 141 and 143, or even through the realignment of seals 141 and 143 against the surfaces for which they bear against. Such realignment may be promoted by applying a viscous agent to reduce friction between one of the seals 141 and 143 and the surface that it bears against. Further, free floating plenum assembly 115 is configured to float in an upward and downward direction through deformation and/or realignment of seals 141 and 143. Further, free floating plenum assembly 115 is configured to float in an inboard and outboard direction through deformation and/or realignment of seals 141 and 143. As such, seals 141 and 143 provide a flexible bearing contact between adjacent components so as to allow plenum assembly 115 to free float as necessary to absorb installation tolerances.

Cowl door assembly 103 is located to the aircraft structure with hinges 105a and 105b. Further, one or more latches may be used to lock, and further locate, cowl door assembly 103 to the aircraft structure. When cowl door assembly 103 is closed, a cowl inlet band 113 mates with a plenum band 117 so that the final installation position of free floating plenum assembly 115 is dictated by cowl door assembly 103. The mating of cowl inlet band 113 and plenum band 117 is secured with the locking of lower plenum clamp 119b and cowl door clamp member 133b, as well as the locking of upper plenum clamp 119a and cowl door clamp member 133a. Access ports 129 and 145 provide access in order to unlock/lock clamp members 133a and 133b when cowl door assembly 103 is closed.

Figure 6:
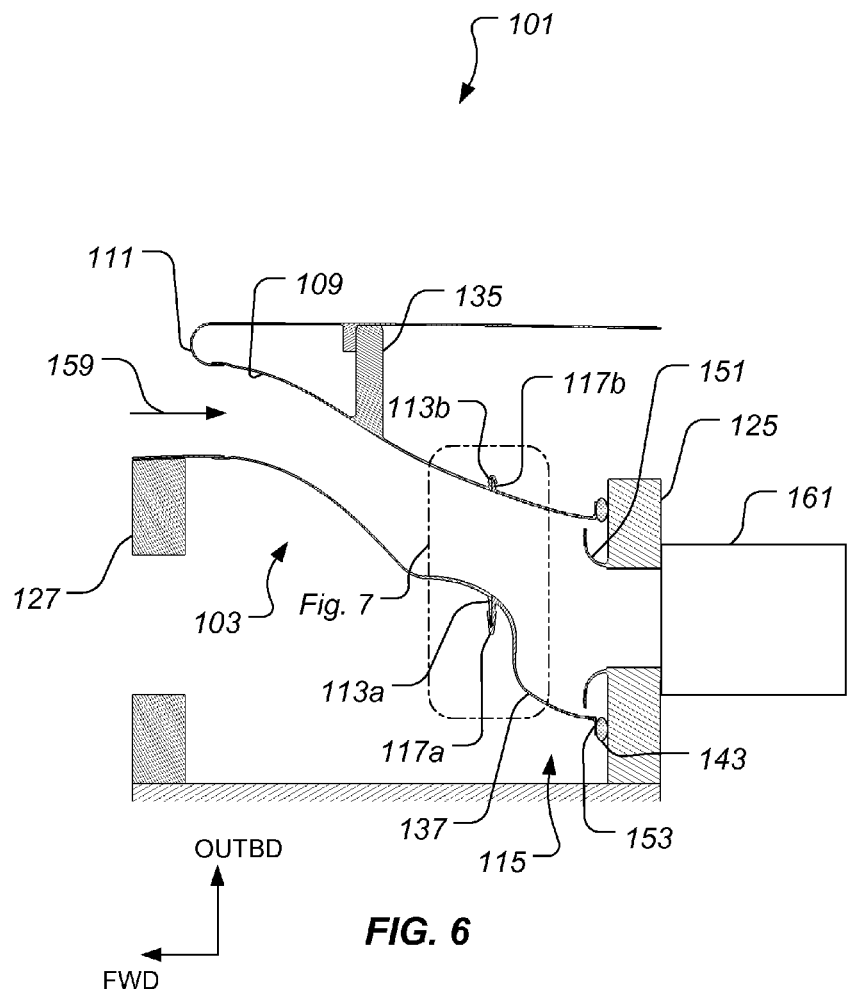
FIG. 6 is a cross-sectional view of the inlet system taken from section lines VI-VI in FIG. 3, according to the preferred embodiment of the present application.
Figure 7:
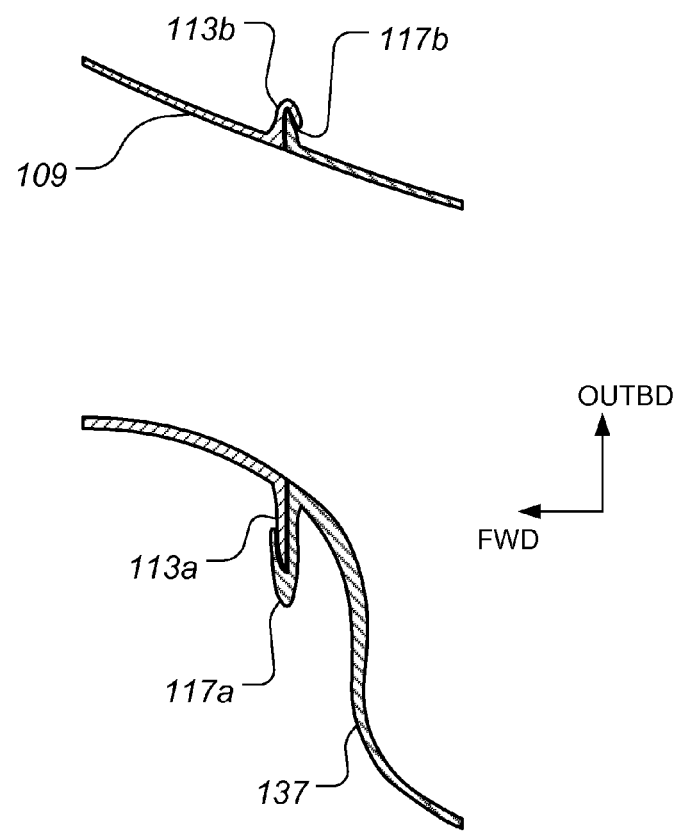
FIG. 7 is a detail view taken from FIG. 6, according to the preferred embodiment of the present application.

Referring now to FIGS. 6 and 7, a partial cross-sectional view of cowl door assembly 103 and plenum assembly 115, in the locked position, is illustrated. During operation of the aircraft, an airflow 159 enters the cowl inlet opening 111 and travels through cowl inlet duct 109, plenum duct 137, and into an engine 161. It is desirable to have a smooth and efficient airflow through the cowl inlet duct 109 and plenum duct 137. Therefore, inlet system 101 is configured so that the mating components between the cowl door assembly 103 and plenum assembly 115 provide a smooth transition between the interior flow surfaces of cowl inlet duct 109 and plenum duct 137. More specifically, the free floating of plenum assembly 115 facilitates alignment of plenum duct 137 to cowl inlet duct 109, so as to provide a smooth interior surface transition between cowl inlet duct 109 and plenum duct 137.

Still referring to FIGS. 6 and 7, the outboard half of cowl inlet band 113 includes a female portion 113b, while the inboard half of cowl inlet band 113 includes a male portion 113a. Conversely, the outboard half of plenum band 117 includes a male portion 117b, while the inboard half of plenum band 117 includes a female portion 117a. During the closing of cowl door assembly 103, mating contact of cowl inlet band 113 and plenum band 117 acts to position plenum assembly 115 into alignment with cowl door assembly 103. More specifically, cowl door assembly 103 is rotated into position so that male portion 117b interacts with female portion 113b, also while male portion 113a interacts with female portion 117a, thereby correcting any misalignment of plenum assembly 115. This insures a smooth transition between the interior flow surfaces of cowl inlet duct 109 and plenum duct 137 by forcing any misalignment to be compensated by forward seal 141, aft seal 143, or combination thereof. The mating portions of cowl inlet band 113 and plenum band 117 forces the interior surfaces of cowl inlet duct 109 and plenum duct 137 to directly abut next to each other without a step or impediment to the airflow. Cowl door clamp members 113a and 113b interact with plenum clamps 119a and 119b, respectively, so as to secure and tighten together cowl inlet band 113 and plenum band 117.

Manufacturing of aircraft structure typically involves building parts within a predefined geometric tolerance range. It is frequently desirable for certain aircraft parts to be interchangeable and replaceable (IR). IR parts are capable of being interchanged between aircraft without effecting the fit and function of the part. Typically, IR parts are more expensive because they are manufactured within a tight tolerance range. However, inlet system 101 achieves IR grade in regards to the positioning of cowl door assembly 103 and plenum assembly 115 relative to each other, without requiring a tight tolerance range. As further described herein, the interaction between plenum band 117 and cowl inlet band 113 acts to reposition plenum assembly 115 relative to cowl door assembly 103 when a misalignment might otherwise occur.

Figure 8:
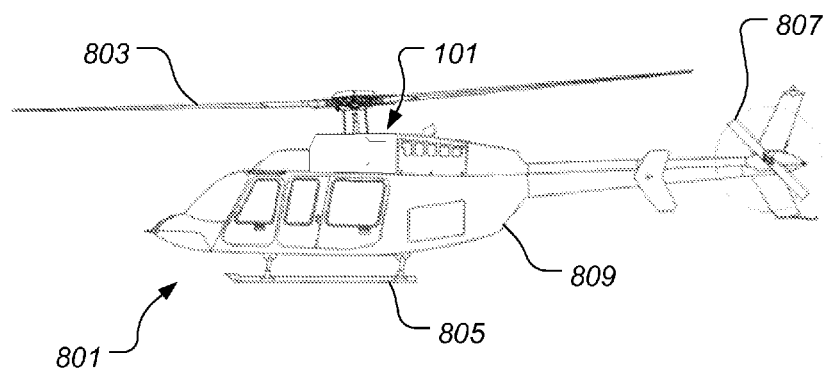
FIG. 8 is a side view of the inlet system on a rotorcraft, according to an embodiment of the present application.

Referring now to FIG. 8, inlet system 101 is illustrated in a rotorcraft 801. Rotorcraft 801 includes a rotor system 803 that is configured to provide lift, thrust, and directional control to rotorcraft 801. A tail rotor 807 provides anti-torque control. Rotorcraft 801 further includes a fuselage 809 and a landing gear 805. In one exemplary embodiment, rotorcraft 801 includes a plurality of engines, each engine having an inlet system 101. It should be appreciated that the engines and corresponding inlet system 101 may be oriented and positioned in a wide variety of configurations. For example, inlet system 101 may be oriented such that cowl inlet opening 111 extends on the left portion, right portion, or top portion of the cowling.

Figure 9:
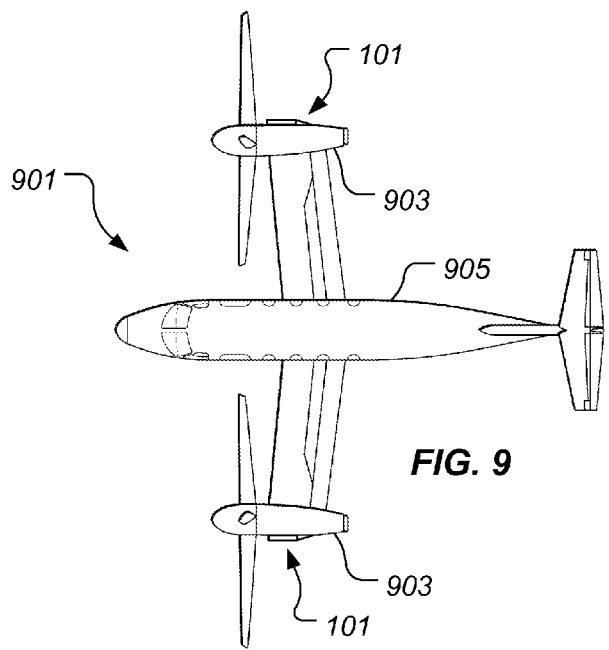
FIG. 9 is a top view of the inlet system on an aircraft, according to an embodiment of the present application.

Referring now to FIG. 9, inlet system 101 is illustrated on an aircraft 901. In one embodiment, aircraft 901 is a tilt rotor aircraft with nacelles 903 that are configured to rotate so that aircraft 901 can fly in a helicopter mode and an airplane mode. Each nacelle 903 includes an engine with an inlet system 101 associated therewith. Even though inlet system 101 is illustrated on the outboard portion of the nacelle 903, it should be appreciated that inlet system 101 may be positioned on other portions of nacelle 903, such as a lower portion, an upper portion, an inboard portion, or a combination thereof. In another embodiment, aircraft 901 is a conventional aircraft having fixed nacelles in lieu of rotatable nacelles 903. With fixed nacelles, aircraft 901 operates similar to a conventional fixed wing aircraft.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An inlet system for an aircraft, the inlet system comprising:
   a cowl door assembly comprising:
      a door member coupled to a structure of the aircraft;
      a cowl inlet opening;
      a cowl inlet duct;
      a cowl inlet band located on a downstream portion of the cowl inlet duct;
   a plenum assembly configured to free float in relation to the cowl door assembly, the plenum assembly comprising:
      a plenum duct;
      a plenum band located on an upstream portion of the plenum duct;
      an aft plenum flange located on a downstream portion of the plenum duct;
   wherein the cowl inlet band and the plenum band are configured to mate, thereby causing alignment of the plenum duct to the cowl inlet duct; and
   wherein the plenum assembly is configured to free float by the way of a compression contact with one or more seals between the plenum assembly and an adjacent structure.

2. The inlet system according to claim 1, the plenum assembly further comprising:
   an aft seal located between the aft plenum flange and a firewall of the aircraft.

3. The inlet system according to claim 1, further comprising:
   a gearbox;
   a forward seal located between an aft faying surface of the gearbox and a forward face of the plenum duct.

4. The inlet system according to claim 1, wherein the cowl inlet band includes a cowl female portion and a cowl male portion.

5. The inlet system according to claim 1, wherein the plenum band includes a plenum female portion and a plenum male portion.

6. The inlet system according to claim 1, further comprising:
   a clamp configured to secure the cowl inlet band and the plenum band together.

7. The inlet system according to claim 1, wherein the inlet system is configured to direct airflow into an engine of the aircraft.

8. The inlet system according to claim 1, wherein aircraft is a rotorcraft.

9. The inlet system according to claim 1, wherein aircraft is a tilt rotor aircraft.

10. An inlet system for a rotorcraft, the inlet system comprising:
    a cowl door assembly comprising:
       a door member coupled to a structure of the aircraft;
       a cowl inlet opening;
       a cowl inlet duct;
       a cowl inlet band located on a downstream portion of the cowl inlet duct;
    a plenum assembly configured to free float in relation to the cowl door assembly, the plenum assembly comprising:
       a plenum duct;
       a plenum band located on an upstream portion of the plenum duct;
       an aft plenum flange located on a downstream portion of the plenum duct;
       an aft seal located between the aft plenum flange and a firewall, the aft seal being configured to provide a compressive contact between the plenum assembly and the firewall;
    wherein the cowl inlet band and the plenum band are configured to connect, thereby ensuring alignment of the plenum duct to the cowl inlet duct.

11. The inlet system according to claim 10, wherein the cowl inlet duct and the plenum duct collectively have a flow path that channels outside air toward an inlet of an engine.

12. The inlet system according to claim 10, wherein the door member is coupled to the structure of the aircraft with a hinge.

13. The inlet system according to claim 10, wherein the door member is coupled to the structure of the aircraft with a latch.

14. The inlet system according to claim 10, further comprising:
    a gearbox;
    a forward seal located between an aft faying surface of the gearbox and a forward face of the plenum duct.

15. The inlet system according to claim 14, wherein the forward seal and the aft seal are configured to allow the plenum assembly to float between the aft faying surface of the gearbox and the firewall.

\* \* \* \* \*